United States Patent Office 3,175,124
Patented Mar. 23, 1965

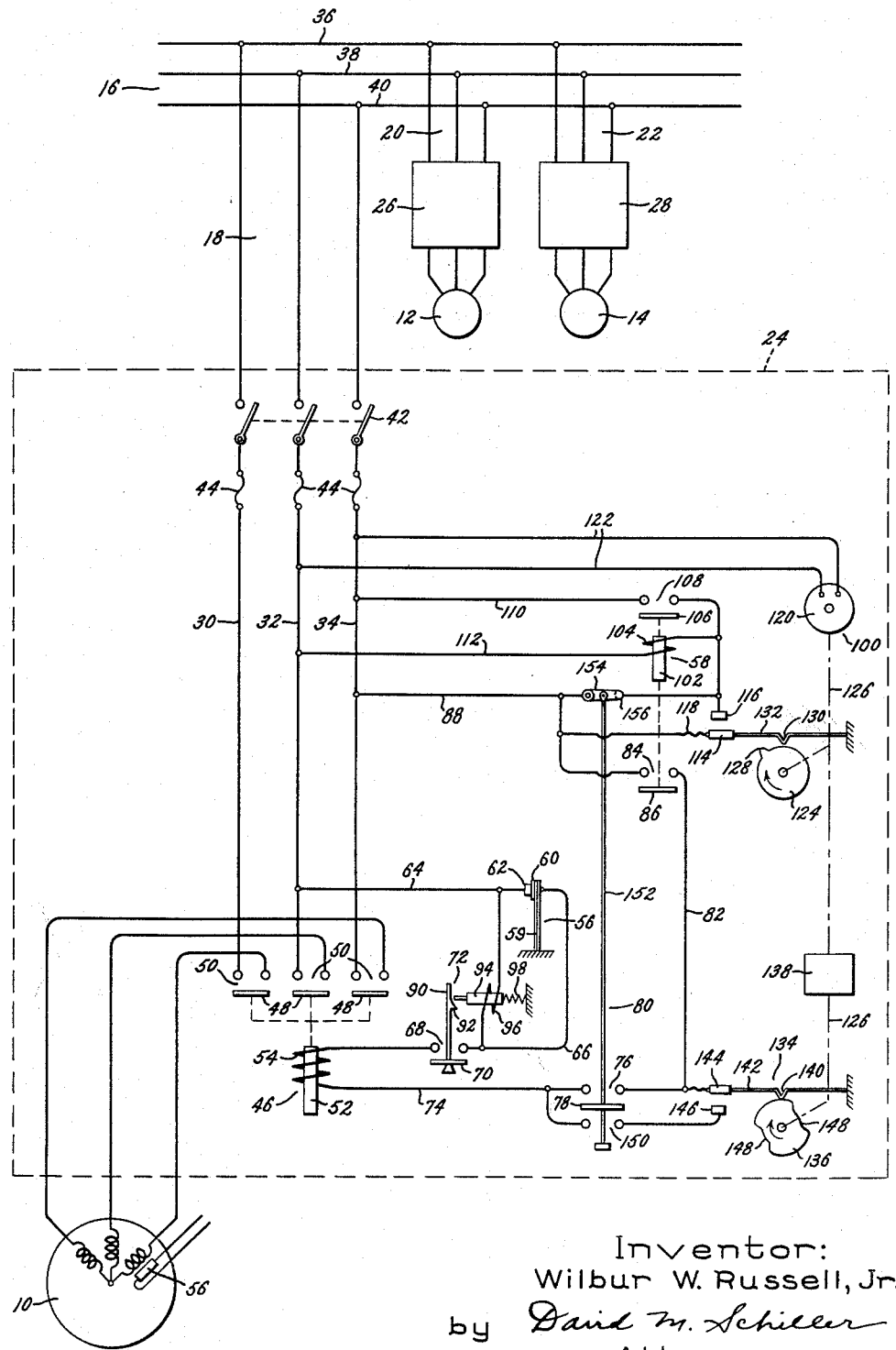

3,175,124
ELECTRICAL CONTROL CIRCUITS
Wilbur W. Russell, Jr., Bloomington, Ill., assignor to General Electric Company, a corporation of New York
Filed June 16, 1961, Ser. No. 117,614
6 Claims. (Cl. 317—13)

This invention relates to electrical control circuits and particularly to circuits for controlling energization of electrical load devices such as inherently protected motors.

In many installations a load device, such as a motor or motor contactor, is energized through a circuit which includes one or more protective devices responsive to circuit conditions such as overload and undervoltage conditions. In such installations it is desirable to interrupt and "lock out" or positively maintain interruption of the energizing circuit in response to an overload condition so that the load remains deenergized until the energizing circuit is reestablished by a manual resetting operation. Such arrangement is advantageous in that it necessitates investigation of apparatus and circuits to determine the cause of the overload. It is also desirable that provision be made for interrupting the energizing circuit in response to an undervoltage condition and for automatically reestablishing the circuit subsequent to such interruption.

Heretofore, difficulty has been encountered in providing such desirable overload and undervoltage controls in circuits which include non-lockable contact overload responsive devices such as are generally associated with motors of the inherently protected type. Such motors ordinarily contain an overload responsive device which is located adjacent the motor windings and which, due to space and other considerations, is generally of the non-lockable contact type wherein the contacts are opened in response to an overload and are not held open, and are closed automatically after removal of the overload condition. The necessity of utilizing such non-lockable overload devices has heretofore complicated the provision of low cost and compact controls of the type described.

It is, therefore, a primary object of the invention to provide a novel and improved circuit for controlling energization of a load device protected by a non-lockable contact type overload responsive device such that the load device is deenergized in response to an overload condition and is prevented from reenergization until a manual resetting operation is performed.

Another object of the invention is the provision of a novel and improved circuit for controlling energization of an inherently protected motor which incorporates a non-lockable contact type overload responsive device such that the motor energizing circuit is interrupted in response to operation of the overload device and remains interrupted until a manual resetting operation is performed.

A further object of the invention is the provision of a circuit as defined in the preceding object including a manually resettable latch-type relay operable in response to operation of the overload responsive device to "lock out" the energizing circuit.

Still another object of the invention is to provide an improved circuit for energizing an inherently protected motor under control of both a non-lockable contact type overload responsive device and an undervoltage responsive device such that the energizing circuit is interrupted in response to operation of the overload device and remains interrupted until a manual resetting operation is performed and such that the energizing circuit is interrupted in response to drop out operation of the undervoltage device and is automatically reestablished by operation of a timing device which periodically permits pick-up of the undervoltage device.

In carrying out the invention in one preferred form, a circuit is provided for energizing an inherently protected motor under the control of a non-lockable contact type overload responsive device, such as a thermally responsive device located adjacent the motor windings, and also under the control of an undervoltage responsive device. Each of these control devices includes contacts in series with the operating coil of a motor contactor which controls energization of the motor. In order to provide a "lock out" operation in response to an overload condition in such a system there is provided a latch-type relay which has contacts in series with the motor contactor coil and which is disposed to be unlatched in response to operation of the overload device so that its contacts open for "locking out" the circuit including the contactor coil. The relay is designed such that its contacts remain open until closed in response to a manual operation thereby permitting reenergization of the contactor coil.

In the preferred form of the invention the latch type relay includes an unlatch coil connected in shunt relation with the contacts of the overload responsive device so that when the overload responsive device is operated to open its contacts, current is shunted through the unlatch coil to open the relay contacts. With such arrangement, the contactor coil remains deenergized even thought the non-lockable contacts have reclosed until the latch-type relay is manually reset.

If an undervoltage condition occurs, the undervoltage responsive device drops out to open its contacts which results in deenergization of the contactor coil. After a time interval has elapsed, the energizing circuit for the undervoltage device is established by a timing switch to effect pick up of the device, if the proper voltage conditions have been restored, to permit reenergization of the contactor coil if the contacts of the latch-type relay and of the overload device are closed. The energizing circuit for the contactor coil may be placed under the control of a program time switch by means of a manually actuable selector switch.

Further objects and advantages of the invention will become apparent from the following description taken in conjunction with the accompanying drawing in which the single figure is a schematic circuit diagram of the control circuit of the present invention.

Referring now to the drawing, there is schematically illustrated in the single figure a control circuit embodying the invention and shown in connection with a plurality of electric motors 10, 12 and 14, each energized from a common electrical power source 16. Although the source 16 is shown as a three phase source, it is to be understood that the source 16 may comprise a single phase source. The three motors may comprise part of an oil field pumping installation, and it is understood that the invention is also applicable to the control of a single motor.

Each of the motors 10, 12 and 14 is connected for energization from the source 16 through separate branch circuits 18, 20 and 22 and separate control circuits 24, 26 and 28. The circuit 24 is shown as inclosed in the broken line rectangle and will be described in detail hereinafter. Each branch circuit is comprised of phase conductors 30, 32 and 34 which are connected to phase conductors 36, 38 and 40 of the source 16. The phase conductors 30, 32 and 34 include contacts of a conventional line switch 42 and a plurality of line fuses 44. Each of the motors is energized under the control of a separate motor contactor 46 each including three movable contacts 48 adapted to engage fixed contacts 50 to connect the motor to the circuit 16. The movable contacts 48 are operatively connected to a magnetic armature 52 surrounded by a coil 54 connected in the control circuit as will presently be described.

In motor installations it is conventionally the practice to energize the motor under the control of one or more protective devices such as overload and undervoltage protective devices. Such devices may assume various forms and operate in response to overload and undervoltage conditions of the motor circuit to deenergize the motor. In many installations, overload devices of the lockable contact type are employed having contacts which open in response to an overload, and which are held open until manually reset. The present invention is particularly applicable to the control of motors of the inherently protected type which incorporate non-lockable contact type overload responsive devices generally located adjacent to the motor windings.

A non-lockable contact type overload responsive device 56 is illustrated in association with the windings of the motor 10 and is also shown in the circuit 24 in the form of a thermally responsive device which operates to open its contacts when a predetermined temperature of the motor windings is attained indicating the presence of an overload. The contacts are not held open but reclose automatically in response to reduction of the winding temperature after the overload has been eliminated. It will be appreciated that overload devices other than the thermally responsive type may be used, and the invention may be employed with such other types. The motor also is energized under the control of an undervoltage responsive device shown schematically in the form of an electromagnetic relay 58 which operates in response to an undervoltage condition to deenergize the motor. The device 56 and the relay 58 are connected in the control circuit in a manner described hereinafter.

It is highly desirable in motor installations to make provision for interrupting the motor energizing circuit in response to an overload condition and to maintain such interruption or "lock out" the circuit until a manual resetting operation is performed. Such arrangement necessitates the inspection of apparatus and circuits to determine the condition causing the overload. Previous "lock out" arrangements in installations including motors of the inherently protected type incorporating non-lockable contact type overload devices have been of complex, multipart design resulting in a high cost "lock out" control. In the present invention a low cost arrangement employing a minimum number of parts is provided for interrupting the energizing circuit of an inherently protected motor in response to an overload condition and for "locking out" the circuit until a manual resetting operation is performed. The invention also contemplates the provision in a single control circuit of a "lock out" arrangement and also an arrangement for interrupting the motor energizing circuit in response to an undervoltage condition and for thereafter automatically re-establishing such circuit if normal voltage conditions are restored.

The device 56 is schematically shown as comprising a bi-metallic element 59 fixed at one end and having at its other end a movable contact 60 cooperating with a fixed contact 62 connected through a wire 64 to the phase conductor 32. The bi-metallic element 59 is located adjacent to one of the windings of motor 10 and in the event that the temperature of the associated winding exceeds a certain level indicating an overload condition, the bi-metallic element 59 will flex toward the right as viewed in the drawing to separate the contacts 60 and 62. These contacts are included in the energizing circuit for the coil 54 of contactor 46 which may be traced from the phase conductor 32 through wire 64, contacts 60–62, a wire 66, fixed contacts 68, which cooperate with a movable contact 70 of a latch type relay 72, coil 54, a wire 74, fixed contacts 76 which cooperate with a movable contact 78 of a manually actuable control switch 80, a wire 82, fixed contacts 84 which cooperate with a movable contact 86 of the undervoltage relay 58, and a wire 88 to the phase conductor 34.

In order to effect the "lock out" operation there is provided the latch type relay 72 which in the present invention operates in response to operation of the device 56 to open the relay contacts 68 for interrupting the energizing circuit for coil 54, and to maintain such interruption even after reclosure of contacts 60–62 until a manual operation is performed to reset relay 72. The relay 72 may be of any suitable type, such for example as an electrically picked up and mechanically dropped out relay. Also, the relay contacts may be latched open or latched closed as desired. In the illustrated and described embodiment the relay 72 is of the mechanically picked up and electrically dropped out type and its contacts are latched closed. The relay 72 is schematically shown as including a manually actuable rod 90 which carries the movable contact 70 and which also carries a cam projection 92 which cooperates with a spring biased, shiftable magnetic armature 94 surrounded by an unlatch coil 96 connected in shunt circuit with the contacts 60–62.

The relay 72 is shown in its unlatched, dropped out condition and in order to pick up the relay 72, the movable arm 92 is manually lifted upwardly as viewed in the drawing to a position where the left-hand end of armature 94 is located beneath the projection 92 to latch the contacts 68–70 in engagement. It is appreciated that other arrangements may be employed to effect the manual pickup operation. For example, the rod 90 may include a magnetic portion surrounded by a coil which is energized in response to actuation of a push button to pick up the relay.

The relay 72 is designed such that when the contacts 60–62 of the overload device are closed, current flowing through the coil 96 is insufficient to effect movement of the armature 94 towards the right to drop out the relay. When the contacts 60–62 open in response to an overload condition, current is shunted through the coil 96 in an amount sufficient to displace the armature 94 to the right which causes the rod 90 to drop to the illustrated position and open the contacts 68. These contacts remain open and the energizing circuit for the contactor coil 54 remains interrupted even though the contacts 60–62 have reclosed until such time as the rod 90 is moved upwardly by a manual operation to close contacts 68.

Energization of the coil 54 is also controlled by an undervoltage responsive device shown in the form of a relay 58 the energization of which is controlled by a timing device 100. The relay 58 is schematically illustrated as including a magnetic armature 102 surrounded by a coil 104, and the armature carries movable contacts 86 and 106 which cooperate respectively with fixed contacts 84 and 108. The contacts 84 are included in the energizing circuit for the coil 54, and the contacts 108 are included in a holding circuit for the coil 104 which circuit may be traced from the phase conductor 34 through a wire 110, contacts 108, coil 104 and a wire 112 to phase conductor 32. The relay 58 is illustrated in its dropped out condition wherein the fixed contacts 84 and 108 are open. When the coil 104 is energized the armature 102 is moved upwardly so that the movable contacts 86 and 106 engage the fixed contacts 84 and 108.

As stated hereinbefore, energization of relay 58 is controlled by the timing device 100 and for this purpose the device 100 includes a contact 114 which is periodically and momentarily moved into engagement with a fixed contact 116 to establish the energizing circuit for the coil 104 of relay 58 which may be traced from the phase conductor 32 through wire 112, coil 104, contacts 114–116, wire 118 and wire 88 to phase conductor 34.

The timing device 100 includes a timing motor 120 which is energized through conductors 122 from the phase conductors 32 and 34, and which is operatively connected to a rotatable cam 124 through a suitable driving connection designated by the dashed line 126. The arrangement is such that the cam 124 is rotated at a predetermined fixed speed by the motor 120 whereby a peripheral projection 128 of cam 124 periodically engages a projection 130 of a resilient contact carrier 132 which carries contact 114. The cam 124 is geared for rotation at the rate of one revolution every few minutes and the projections 128 and 130 will be engaged for a brief interval such as a few seconds during which time the contact 114 will be elevated into engagement with contact 116. When these contacts engage, the coil 104 will be energized to close contacts 84 and 108 which establishes the holding circuit to maintain energization of coil 104 subsequent to disengagement of projections 128 and 130 and contacts 114–116.

It is thus seen that the energizing circuit for coil 54 will automatically be reestablished a time interval subsequent to interruption thereof by operation of relay 58 in response to an undervoltage condition. This is in contrast to the requirement of a manual operation to reestablish the energizing circuit subsequent to interruption thereof due to an overload condition. The timing devices may be arranged so that the cams 124 of the circuits 24, 26 and 28 close the associated contacts either according to a random or definite time schedule selected so as to minimize the possibility that the several motors will be simultaneously reenergized.

If desired, each of the timing devices 100 may also include a program switch 134 for further controlling energization of the contactor coils. The switch 134 may be of any suitable construction and is arranged to be opened and closed at selected times for predetermined intervals which times and intervals may be readily adjusted to give a desired operating cycle for each motor. The switch 134 is schematically illustrated as including a cam 136 which is rotated by the motor 120 through a reduction gear train represented by the box 138 at a predetermined sped, such for example as one revolution per day. The periphery of cam 136 engages a projection 140 of a resilient contact carrier 142 which carries a contact 144 movable with respect to a fixed contact 146. In the illustrated embodiment the cam 136 is recessed at diametrically opposed areas indicated by the reference numerals 148, and when cam 136 has rotated to bring one of the recessed areas beneath projection 140, carrier 142 is moved downwardly to move contact 144 into engagement with contact 146.

With the arrangement shown the intervals during which contacts 144–146 are engaged are substantially equal to intervals during which said contacts are disengaged. Also, these intervals are long compared to the relatively short intervals during which contacts 114 and 116 are engaged. The contacts 144 and 146 are connected in series with fixed contacts 150 which cooperate with contact 78 of the manually operable control switch 80. As a result the program switch 134 exercises control over energization of contactor coil 54 only when switch 80 is positioned such that contacts 150 are closed. For any other position of switch 80, the program switch 134 is effectively disconnected from the circuit and has no control over energization of coil 54.

The switch 80 includes a rod 152 which carries movable contacts 78 and 154 with the latter contact cooperating with a fixed contact 156 included in an energizing circuit for coil 104 of relay 58. The switch 80 is actuable to three positions including a first position wherein the contact 78 engages contacts 150 and the contact 154 is disengaged from the contact 156, a second position shown wherein contact 78 is intermediate contacts 76 and 150 and contact 154 engages contact 156, and a third position wherein contact 78 engages contact 76 and contact 154 is disengaged from contact 156. When switch is in its illustrated second position, the energizing circuit for coil 54 is interrupted and as a result the motor 10 cannot be energized.

In operation, the switch 80 is initially moved to the position illustrated and for this position of switch 80 the energizing circuit for coil 104 is completed so that coil 104 is energized to pick up armature 102 and close contacts 84 and 108. The next step is to manually actuate the latch type relay 72 to pick up such relay if it is in a dropped out condition. The switch 80 is next operated to a position wherein contact 78 engages contacts 150 and contact 154 is disengaged from contact 156. When this is done, the contactor coil 54 is placed under the control of program switch 134 and will be energized and deenergized in accordance with rotation of cam 136. Energization of coil 104 is maintained through the holding circuit including now closed contacts 108. If an overload condition should occur, contacts 60–62 will be disengaged whereby sufficient current is shunted through coil 96 to displace armature 94 and unlatch relay 72 to deenergize contactor 46 and motor 10. Contactor coil 54 remains deenergized even after bi-metallic element 58 has cooled sufficiently to reengage contacts 60 and 62 until relay 72 is latched by manual actuation thereof to close contacts 68.

In the event of occurrence of an undervoltage condition or a complete loss of voltage, armature 102 is dropped out to its illustrated position, thereby opening contacts 84 and 108 which effects deenergization of coil 54 and motor 10. After the lapse of a certain time interval, cam 124 will be rotated to a position wherein projections 128 and 130 engage to thereby cause engagement of contacts 114 and 116, and energization of coil 104 which picks up armature 102 to again close contacts 84 and 108. If normal voltage conditions have been restored, contacts 84 remain closed and the energizing circuit for coil 54 will be established if contacts 68 and 144–146 are closed whereby contactor 46 is picked up to effect energization of motor 10.

Although the invention has been described with reference to certain specific embodiments thereof, numerous modifications are possible and it is intended in the attached claims to cover all modifications falling within the spirit and scope of the invention.

What I claim as new and desire to secure by Letters Patent of the United States is:

1. In a circuit for controlling energization of an electric motor of the inherently protected type from a power source, an overload responsive device for protecting the motor against overload conditions, said overload responsive device having non-lockable contacts which open in response to an overload condition and which automatically close subsequent to elimination of the overload condition, a contactor for controlling energization of the motor having an operating winding to be connected in series circuit with said nonlockable contacts across a power source, a relay having contacts connected in said series circuit, said relay including means disposed for operation in response to opening of said non-lockable contacts for opening the relay contacts to interrupt the series circuit and for maintaining the relay contacts open until a manual contact closing operation is performed, and means manually operable to effect closure of said relay contacts and permit reestablishment of the series circuit.

2. In a circuit for controlling energization of an electric motor of the inherently protected type from a power source, a thermoresponsive device in heat transfer relation with windings of the motor for protecting the motor against overload conditions, said thermoresponsive device having non-lockable contacts which open in response to an overload condition and which automatically close subsequent to elimination of the overload condition, a contactor for controlling energization of the motor having an operating winding to be connected in series circuit with said non-lockable contacts across a power source, a relay having contacts connected in said series circuit, said relay including means disposed for operation in response to opening of said non-lockable contacts for opening the relay contacts to interrupt the series circuit and for maintaining the relay contacts open until a manual contact closing operation is performed, and means manually operable to effect closure of the relay contacts and permit reestablishment of the series circuit.

3. In a circuit for controlling energization of an electric motor of the inherently protected type from a power source, a thermoresponsive device in heat transfer relation with windings of the motor for protecting the motor against overload conditions, said thermoresponsive device having non-lockable contacts which open in response to an overload condition and which automatically close subsequent to elimination of the overload condition, a contactor for controlling energization of the motor having an operating winding to be connected in series circuit with said non-lockable contacts across a power source, a relay having contacts connected in said series circuit, said relay including an electrical winding connected in shunt relation with said non-lockable contacts across a power source for energization in response to opening of the non-lockable contacts to open the relay contacts, means for maintaining the relay contacts open until a manual contact closing operation is performed, and means manually operable to effect closure of said relay contacts.

4. In a circuit for controlling energization of an electric motor of the inherently protected type from a power source, an overload responsive device for protecting the motor against overload conditions, said overload responsive device having non-lockable contacts which open in response to an overload condition and which automatically close subsequent to elimination of the overload condition, a contactor for controlling energization of the motor having an operating winding to be connected in series circuit with said non-lockable contacts across a power source, a relay having contacts connected in said series circuit, said relay including means disposed for operation in response to opening of said non-lockable contacts for opening the relay contacts to interrupt the series circuit and for maintaining the relay contacts open until a manual contact closing operation is performed, means manually operable to effect closure of said relay contacts and permit reestablishment of the series circuit, an undervoltage responsive device for protecting the motor against undervoltage conditions, said undervoltage responsive device having contacts connected in series circuit with said relay contacts and which open for deenergizing the contactor operating winding in response to an undervoltage condition, and means for automatically closing the contacts of said undervoltage responsive device a time interval subsequent to opening of the contacts.

5. In a circuit for controlling energization of an electric motor of the inherently protected type from a power source, a thermoresponsive device in heat transfer relation with windings of the motor for protecting the motor against overload conditions, said thermoresponsive device having non-lockable contacts which open in response to an overload condition and which automatically close subsequent to elimination of the overload condition, a contactor for controlling energization of the motor having an operating winding to be connected in series circuit with said non-lockable contacts across a power source, a relay having contacts connected in said series circuit, said relay including means disposed for operation in response to opening of said non-lockable contacts for opening the relay contacts to interrupt the series circuit and for maintaining the relay contacts open until a manual contact closing operation is performed, means manually operable to effect closure of the relay contacts and permit reestablishment of the series circuit, an undervoltage responsive device for protecting the motor against undervoltage conditions, said undervoltage responsive device having contacts connected in said series circuit and which open for deenergizing the contactor operating winding in response to an undervoltage condition, and means for automatically closing the contacts of said undervoltage responsive device a time interval subsequent to opening of the contacts.

6. In a circuit for controlling energization of an electric motor of the inherently protected type from a power source, a thermoresponsive device in heat transfer relation with windings of the motor for protecting the motor against overload conditions, said thermoresponsive device having non-lockable contacts which open in response to an overload condition and which automatically close subsequent to elimination of the overload condition, a contactor for controlling energization of the motor having an operating winding to be connected in series circuit with said non-lockable contacts across a power source, a relay having contacts to be connected in said series circuit, said relay including means disposed for operation in response to opening of said non-lockable contacts for opening the relay contacts to interrupt the series circuit and for maintaining the relay contacts open until a manual contact closing operation is performed, means manually operable to effect closure of the relay contacts and permit reestablishment of the series circuit, an undervoltage responsive device for protecting the motor against undervoltage conditions, said undervoltage responsive device having contacts connected in said series circuit, and having an operating winding effective when energized below a selected level to open the undervoltage contacts for deenergizing the motor, means for automatically closing the undervoltage contacts a time interval subsequent to opening thereof comprising a timing device operable to periodically and momentarily connect said undervoltage operating winding across a power source, and a program switch having contacts in said series circuit.

References Cited by the Examiner
UNITED STATES PATENTS

| | | | |
|---|---|---|---|
| 2,008,174 | 7/35 | Frank | 317—54 X |
| 2,056,040 | 9/36 | Dozler | 317—40 |
| 2,196,418 | 4/40 | Kintzing | 317—31 |
| 2,443,260 | 6/48 | Matthews | 317—22 |
| 3,062,990 | 11/62 | Brown | 317—54 X |

SAMUEL BERNSTEIN, *Primary Examiner.*